United States Patent [19]

Umeda et al.

[11] 4,220,352
[45] Sep. 2, 1980

[54] SUSPENSION FOR A FRONT AXLE OF A TRAILER

[75] Inventors: Haruhiko Umeda, Yokohama; Masaru Uenoyama, Ayase; Kotoshige Ishizuki, Yokohama; Hiroyuki Ando; Naotaka Endo, both of Kawasaki, all of Japan

[73] Assignee: Kabushiki Kaisha Komatsu Seisakusho, Tokyo, Japan

[21] Appl. No.: 951,061

[22] Filed: Oct. 13, 1978

[30] Foreign Application Priority Data

Oct. 13, 1977 [JP] Japan .......................... 52-136261[U]
Oct. 13, 1977 [JP] Japan .......................... 52-136262[U]

[51] Int. Cl.² ............................................. B06G 13/00
[52] U.S. Cl. ............................... 280/708; 280/476 R; 280/494; 280/724; 280/125; 280/132
[58] Field of Search ............... 280/109, 492, 493, 494, 280/702, 711, 724, 476 R, 708, 132, 125, 126

[56] References Cited

U.S. PATENT DOCUMENTS

| 3,239,242 | 3/1966 | Adams | 280/494 |
| 3,331,619 | 7/1967 | Muelling | 280/494 |
| 3,873,121 | 3/1975 | Ito et al. | 280/708 |

Primary Examiner—Robert R. Song
Attorney, Agent, or Firm—Armstrong, Nikaido, Marmelstein & Kubovcik

[57] ABSTRACT

A suspension for a front axle of a trailer comprising a trailer frame, an outer cylindrical member fixedly secured to the trailer frame, a bracket mounted on the front axle, a shaft mounted on the bracket and arranged at right angles to the front axle, a sleeve rotatably mounted on the shaft, an inner cylindrical member fixedly secured to the sleeve and adapted to slide within the outer cylindrical member, a first spring retainer pivotally mounted on the outer cylindrical member, a second spring retainer pivotally mounted on the sleeve, and a spring disposed between the first and second spring retainers.

4 Claims, 3 Drawing Figures

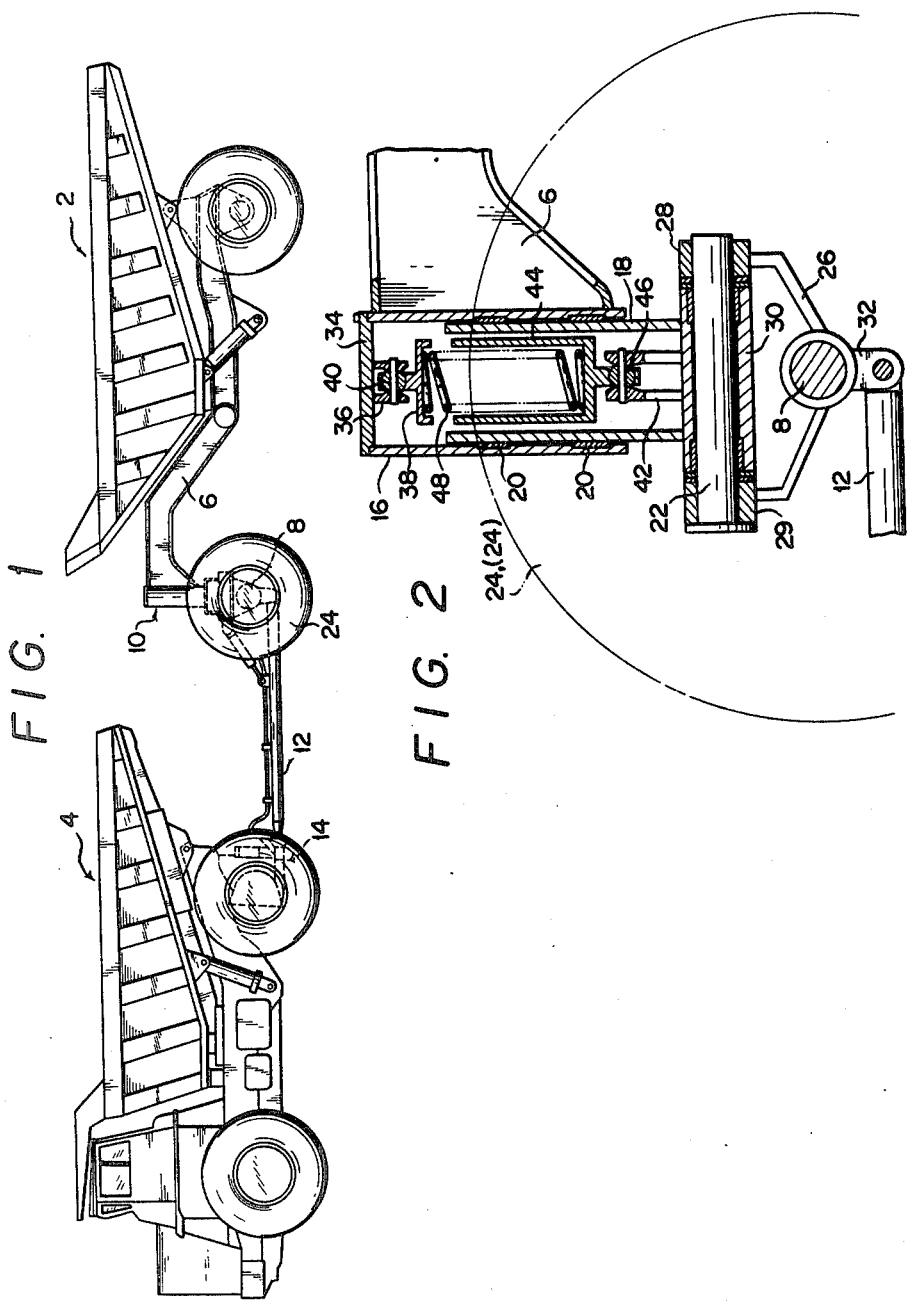

SUSPENSION FOR A FRONT AXLE OF A TRAILER

BACKGROUND OF THE INVENTION

This invention relates to a suspension means for a front axle of a trailer.

Trailers are towed by tractors with the leading end of their draw bars connected to a connecting means mounted in the rear axle casing of the tractors.

The front axle of conventional trailers has heretofore been constructed as an integral part of a frame and has had no shock absorbing function except rubber tyres.

For this reason, shock loading exerted on the front axle means has caused a significant problem as the size and running speed of trailers are increased.

Whilst, vertical loading and transverse loading due to towing are exerted on the front axle means and the front axle is required to be turned for steering the vehicle, and therefore ordinary type shock absorber means cannot be used.

SUMMARY OF THE INVENTION

It is therefore an object of the present invention to provide an improved suspension means for the front axle of a trailer.

Another object of the present invention is to provide a suspension for the front axle of a trailer which can withstand shock loads in the vertical direction effectively.

A still further object of the present invention is to provide a suspension for the front axle of a trailer which can effectively absorb lateral loadings caused by towing and allow turning motion for steering thereof.

In accordance with an aspect of the present invention, there is provided a suspension for a front axle of a trailer comprising a trailer frame, an outer cylindrical member fixedly secured to said trailer frame, bracket means mounted on said front axle, shaft means mounted on said bracket means, said shaft means being arranged at right angles to said front axle, a sleeve rotatably mounted on said shaft means, and an inner cylindrical member fixedly secured to said sleeve and adapted to slide within said outer cylindrical member.

A first spring retainer is pivotally mounted on said outer cylindrical member while a second spring retainer is pivotally mounted on said sleeve.

A spring means is disposed between said first and second spring retainers so as to effectively absorb shock loads in the vertical direction.

According to another aspect of the present invention, a hydropneumatic damping means is used instead of spring means. A cylindrical suspension member is suspended from said outer cylindrical member and which is adapted to slide within said inner cylindrical member. Fluid and compressed gaseous medium are filled in said cylindrical suspension member. A first bushing is inwardly mounted on said inner cylinder and a second bushing is outwardly mounted on said cylindrical suspension member defining a cylindrical chamber between said first and second bushings. A communicating means is provided to allow said cylindrical chamber to communicate with the fluid contained in said cylindrical suspension member.

The above and other objects, features and advantages of the present invention will be readily apparent from the following description taken in conjunction with the accompanying drawings.

BRIEF DESCRIPTION OF THE DRAWINGS

FIG. 1 is a side elevational view of a dump truck and trailer combination employing a suspension means according to the present invention for the front axle of the trailer;

FIG. 2 is a cross-sectional view of a suspension means according to the present invention.

DETAILED DESCRIPTION OF THE INVENTION

Figure 3:
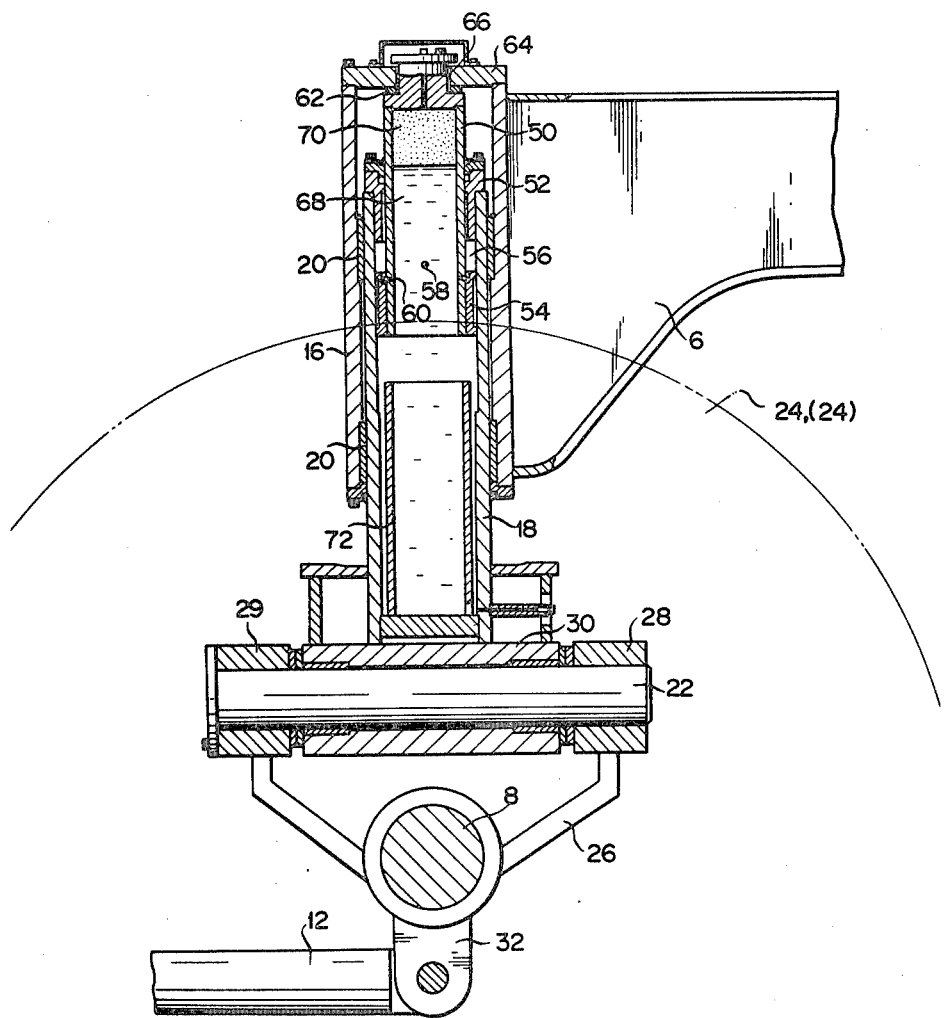
FIG. 3 is a cross-sectional view of another embodiment of suspension means according to the present invention.

The present invention will now be described in detail below with reference to the accompanying drawings. A trailer 2 is towed by a dump truck 4. A suspension means 10 according to the present invention is provided for a front axle 8 of the trailer 2 and is fixedly secured to a frame 6 of the trailer. Reference numeral 12 denotes a draw bar which is pivotally mounted on the front axle 8 and the leading end of which is engageable with a coupling means 14 mounted on a rear axle casing of the dump truck 4. Referring to FIG. 2, reference numeral 16 denotes an outer cylindrical member fixedly secured to the frame 6 in which an inner cylindrical member 18 is mounted to slide freely through bushings 20, 20. Whilst, a pair of tyres 24, 24 are mounted on the ends of the front axle 8, and a shaft 22 is mounted at right angles to the front axle 8 through a bracket 26 and sleeves 28 and 29. The shaft 22 has a sleeve 30 which is rotatably mounted thereon and to which the inner cylindrical member 18 is fixedly secured. Fixedly secured to the lower end of the front axle 8 is a bracket 32 to which the draw bar 12 is pivotally connected by a pin. An upper spring retainer 38 is mounted on a bracket 36 by a swivel joint 40 so as to oscillate freely relative to the bracket. A bracket 42 is fixedly secured to the sleeve 30, and a cylindrical lower spring retainer 44 is mounted on the bracket 42 by a swivel joint 46 so as to oscillate freely relative to the bracket. A compression spring 48 is interposed between both spring retainers 38 and 44, the spring 48 being adapted to absorb shock loads exerted in the vertical direction.

In the above-mentioned arrangement, the trailer 2 can be driven with its draw bar 8 connected to the coupling means 14 of the dump truck 4, and the tractive force caused at that time is supported by the bushings 20, 20 mounted between the inner and outer cylindrical members 18, 16.

If the inner cylindrical member 18 is eccentrically moved or offset relative to the outer cylindrical member 16 by the clearance between them, then the compression spring 48 therein will be inclined relative to the outer cylindrical member 16; however, such inclining movement will be absorbed by pivotal movements of the spring retainers 38 and 44 so that the loading caused by the tractive force is not exerted on the compression spring 48.

Though in the above-mentioned embodiment the compression spring 48 is mounted between the outer cylindrical member 16 and the inner cylindrical member 18, another type shock absorber means may be provided instead of it. Steering of the vehicles can be made by rotating the inner cylindrical member 18 relative to the outer cylindrical member 16.

Referring to FIG. 3, there is shown another embodiment of the present invention. In this drawing, reference numeral 16 indicates an outer cylindrical member fixedly secured to a frame 6 at right angles to the latter, and 18 an inner cylindrical member slidably mounted within the outer cylindrical member 16 through bushings 20, 20. A shaft 22 is carried at the lower end of the inner cylindrical member 18 with its axis extending in the horizontal and longitudinal direction. Fixedly secured to the shaft 22 through a bracket 26 is a front axle 8 having a pair of tyres 24 and 24 rotatably mounted on both ends thereof. A draw bar 12 is connected to the bracket 32 of the front axle 8.

The above-mentioned inner cylindrical member 18 is a hollow tube with its upper end open in which tube is fitted a suspension cylinder 50 having its upper end fitted in the upper part of the outer cylindrical member 16. An upper bushing 52 is located between the suspension cylinder 50 and the inner cylindrical member 18 and is fixedly secured to the upper part of the inner cylindrical member, and a lower bushing 54 is fixedly secured to the lower part of the suspension cylinder 50. Defined between the upper and lower bushings 52 and 54 is a space 56 which communicates with the inside of the suspension cylinder 50 through an orifice 58 and a check valve 60 which permits only fluid flow from the side of the suspension cylinder 50. The upper part of the suspension cylinder 50 abuts against and is carried by a cover 64 of the outer cylindrical member 16 through a thrust plate 62, and there is left some clearance 66 between the cover 64 and the upper part of the suspension cylinder 50. Filled within the above-mentioned suspension cylinder 50 are oil 68 and nitrogen gas 70. Reference numeral 72 denotes a stopper means for the suspension cylinder 50.

In the above-mentioned arrangement, the trailer can be run by the draw bar, when towed, and the tractive force generated at that time is exerted as a moment through the inner cylindrical member 18 on the outer cylindrical member 16. The tractive force is carried by the bushings 20, 20 mounted between the outer and inner cylindrical members 16 and 18. If at that time the inner cylindrical member 18 is eccentrically moved or offset relative to the outer cylindrical member 16 by the clearance between them, then the suspension cylinder 50 will be inclined correspondingly relative to the outer cylindrical member 16; however, such inclining movement can be absorbed by the space 66 formed between the upper part of the outer cylindrical member 16 and the cover 64 so that the load caused by the tractive force is not exerted on the suspension cylinder 50.

In the case during running of the vehicles the dead load applied to the outer cylindrical member 16 is changed by an external force applied thereto, the suspension cylinder 50 is slidably moved relative to the inner cylindrical member 18 by both the spring action obtained by compressive deformation of the nitrogen gas within the suspension cylinder 50 and the damping effect by the orifice 58 thereby relieving the changes of the dead load caused by the external force applied thereto. At that time, in synchronism with the movement of the suspension cylinder 50, the outer cylindrical member 16 is slidably moved relative to the inner cylindrical member 18.

Whilst, steering of the trailer can be made by gyrating the inner cylindrical member 18 relative to the outer cylindrical member 16.

As described hereinabove, according to the present invention, even if the transverse load due to running of the tractor with the trailer being towed is exerted or the vehicles are turned for steering, vertically applied shock loads can be absorbed without any influence thereof.

Further, in the above-mentioned second embodiment, a hydro-pneumatic suspension arrangement is made within the inner cylindrical member 18 so as to absorb the axial shock load of the inner cylindrical member 18 exerted on the outer cylindrical member 16, and therefore very excellent shock absorbing effect can be obtained.

It is to be understood that the above description is by way of example only, and that details for carrying the invention into effect may be varied without departing from the scope of the invention as set forth in the appended claims.

What we claim is:

1. A suspension for a front axle of a trailer comprising a frame of the trailer;
    an outer cylindrical member fixedly secured to said frame;
    bracket means mounted on said front axle;
    shaft means mounted on said bracket means, said shaft means being arranged at right angles to said front axle;
    a sleeve rotatably mounted on said shaft means;
    an inner cylindrical member fixedly secured to said sleeve and adapted to slide within said outer cylindrical member;
    a first spring retainer pivotally mounted on said outer cylindrical member;
    a second spring retainer pivotally mounted on said sleeve;
    spring means disposed between said first and second spring retainers; and
    a cylindrical bushing disposed between said outer and inner cylindrical members.

2. The suspension as defined in claim 1 wherein said first spring retainer is mounted on said outer cylindrical member by a first swivel joint and said second spring retainer is mounted on said sleeve by a second swivel joint.

3. A suspension for a front axle of a trailer comprising a trailer frame; an outer cylindrical member fixedly secured to said trailer frame;
    bracket means mounted on said front axle;
    shaft means mounted on said bracket means, said shaft means being arranged at right angles to said front axle;
    a sleeve rotatably mounted on said shaft means;
    an intermediate cylindrical member fixedly secured to said sleeve and adapted to slide within said outer cylindrical member;
    an inner cylindrical member suspended from said outer cylindrical member and adapted to slide within said intermediate cylindrical member, said inner cylindrical member having fluid and compressed gaseous medium contained therein;
    a first bushing inwardly mounted on said intermediate cylinder;
    a second bushing outwardly mounted on said inner cylindrical member defining a cylindrical chamber between said first and second bushings; and
    means for communicating said cylindrical chamber with the fluid contained in said inner cylindrical member.

4. The suspension as defined in claim 3 further comprising a third bushing disposed between said outer and intermediate cylindrical members.

* * * * *